United States Patent

Ballin

Patent Number: 5,129,731
Date of Patent: Jul. 14, 1992

[54] UNIT FOR DETECTING FREEZER MALFUNCTION

[76] Inventor: Gene Ballin, 240 Glen Head Rd., Glen Head, N.Y. 11545

[21] Appl. No.: 723,568

[22] Filed: Jul. 1, 1991

[51] Int. Cl.⁵ .......................................... G01K 11/06
[52] U.S. Cl. .................................. 374/106; 374/160; 116/217
[58] Field of Search ................ 374/106, 160; 116/217

[56] References Cited

U.S. PATENT DOCUMENTS

| | | | |
|---|---|---|---|
| 2,662,018 | 12/1953 | Smith | 116/217 |
| 2,847,067 | 8/1958 | Brewer | 116/217 |
| 3,243,303 | 3/1966 | Johnson | 374/106 |
| 3,967,579 | 7/1976 | Seiter | 374/106 |
| 4,106,339 | 8/1978 | Baer | 374/109 |
| 4,114,443 | 9/1978 | Clark | 116/217 |
| 4,844,622 | 7/1989 | Weiss | 374/107 |
| 4,893,477 | 1/1990 | Vazquez | 374/160 |
| 4,941,425 | 7/1990 | Holzer | 374/160 |
| 4,973,170 | 11/1990 | Bescherer et al. | 374/109 |

FOREIGN PATENT DOCUMENTS

| | | | |
|---|---|---|---|
| 3243031 | 5/1984 | Fed. Rep. of Germany | 116/217 |
| 0625618 | 9/1981 | Switzerland | 374/160 |
| 0676882 | 7/1979 | U.S.S.R. | 374/160 |
| 0232988 | 4/1925 | United Kingdom | 116/217 |

Primary Examiner—William A. Cuchlinski, Jr.
Assistant Examiner—Diego F. F. Gutierrez
Attorney, Agent, or Firm—Howard C. Miskin

[57] ABSTRACT

A device for monitoring temperature conditions in a frozen food storage space includes a rear panel and a parallel transparent plastic front wall having a peripheral skirt wall sealed to the panel front face. Laterally spaced projections intermediate the front wall top and bottom extend from the front toward the rear wall to delineate top and bottom cavity sections, one of which contains colored water. A suction cup is located on the panel rear face and indicia are formed on the panel front face registering with each cavity section. The device is located in the storage space until the water in the lower cavity section is frozen solid and is then inverted. The presence of water in the bottom cavity of the inverted device indicates the occurrence of a thawing condition in the storage space at the same time.

6 Claims, 2 Drawing Sheets

U.S. Patent  July 14, 1992  Sheet 1 of 2  5,129,731
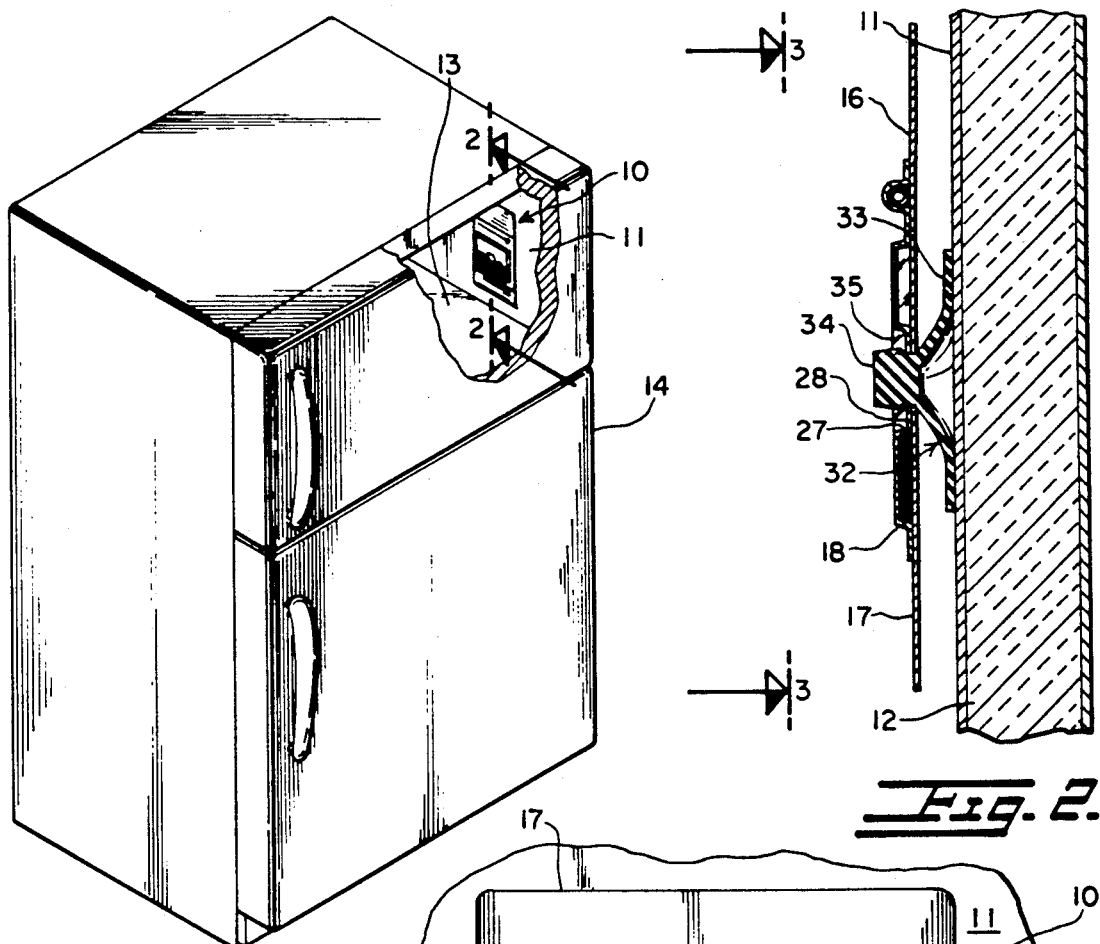
Fig. 1.
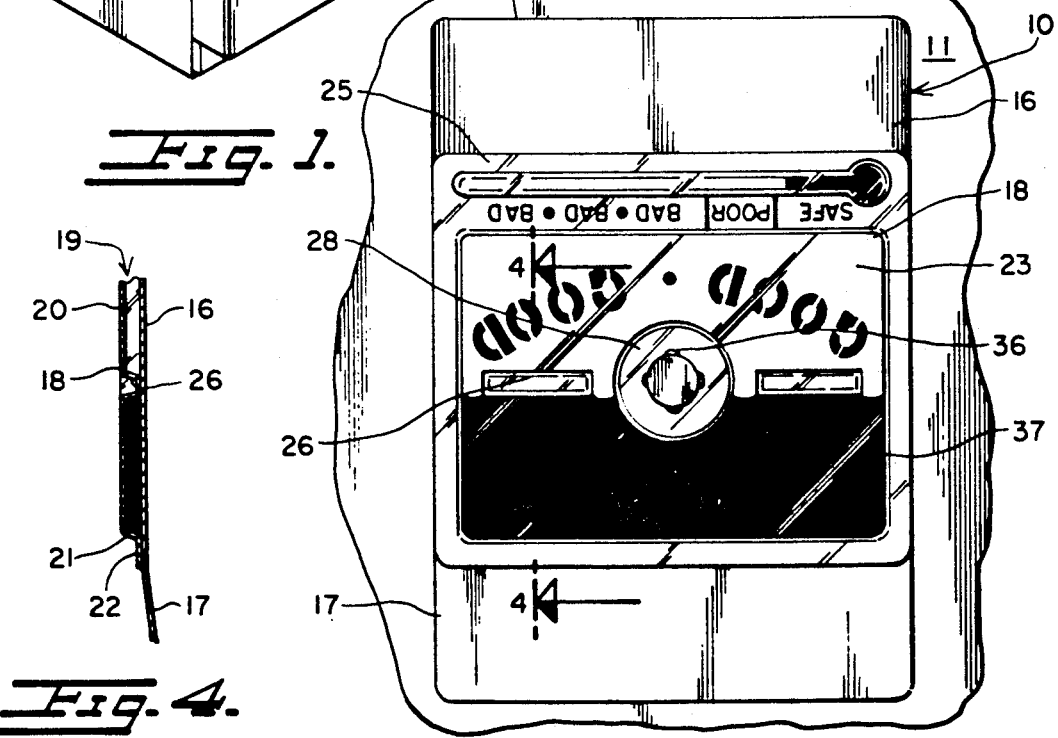
Fig. 2.
Fig. 3.
Fig. 4.

UNIT FOR DETECTING FREEZER MALFUNCTION

BACKGROUND OF THE INVENTION

The present invention relates generally to improvements in measuring and methods and it relates particularly to an improved device and method for monitoring the temperature parameters in a frozen food storage space.

The proper storing of frozen foods requires a storage space continuously maintained at a sub-freezing temperature in order to prevent any even temporary thawing of the stored food. The thawing and refreezing of frozen food is often very deleterious to the food. It not only adversely affects the flavor and eating quality of the refrozen food but it could be a health hazard. In the domestic storage of frozen foods in freezers or the freezing sections of refrigerators, the temporary or inadequate overall cooling of the freezer space due to power failures or other reasons is a common occurrence. The cooling cycle in domestic food freezers is conventionally discontinuous. When the cooling mode is interrupted for an excessive period due to a defect or power failure, the interruption in cooling may be sufficiently long to result in a raising of the temperature in the freezing compartment resulting in thawing of the stored food with its undesirable effects. Periodic checking the temperature of the freezer space may be inadequate in determining the condition of the frozen food since the freezer space may have been adequately cooled following a period of warming and consequent thawing of the food which is thereafter refrozen. Thus, there is no apparent indication of the food having been thawed and refrozen. The freezer temperature at the time following the refreezing of the thawed food is no indication of the food's condition. A thermometer measuring the temperature range of the freezer space is unsatisfactory since, at maximum temperature, the period of higher temperature may have been too short to result in thawing or damage to the freezer-stored food.

SUMMARY OF THE INVENTION

It is a principal object of the present invention to provide an improved monitor and measuring device and method.

Another object of the present invention is to provide an improved method and device for continuous monitoring the condition of a frozen food freezing space.

Still another object of the present invention is to provide an improved method and device for indicating over a duration of time the condition of frozen food in a frozen food storage space.

A further object of the present invention is to provide an improved method and apparatus for indicating conditions conducive to the thawing of frozen food in a freezer or refrigerator freezing section.

Still a further object of the present invention is to provide an improved method and device of the above nature characterized by their simplicity, compactness, ease and convenience of use and application and their great versatility and adaptability.

The above and other objects of the present invention will become apparent from a reading of the following description taken in conjunction with the accompanying drawings which illustrate a preferred embodiment thereof.

A monitor and measuring device in accordance with the present invention includes an invertible chamber having alternatively raised vertically spaced first and second sections in liquid communication and its interior visually accessible, a freezable aqueous body located in said chamber and means for retaining said aqueous body when in a frozen state in one of said chamber sections when disposed above the other of said chamber sections. In employing the improved device, it is disposed in the frozen food storage space with the aqueous body located in the lowermost chamber and is so positioned until the aqueous body freezes solid, whereupon the chamber is inverted to bring the frozen aqueous body containing chamber section above the other chamber section. Under normal cooling conditions of the frozen food storage area, the frozen aqueous body will remain uppermost in the chamber. However, in the event that the storage space temperature drops below freezing for an unacceptable period of time sufficient to thaw the stored frozen food, the frozen aqueous body will likewise thaw and the resulting liquid will flow and remain in the other or lower chamber compartment and its observation in this position provides an indication of the unacceptable drop in temperature for an extended period in the frozen food storage space.

In a preferred embodiment of the present invention, the chamber is defined by a rear panel and a front member formed of transparent plastic sheet and including a rectangular front wall and a rearwardly extending peripheral skirt wall terminating in outwardly projecting flanges affixed to the rear panel. Laterally space rearwardly projecting laterally extending ridges are formed in the front wall to divide the chamber into vertically space sections which are in liquid communication. Approximately filling one of the sections is colored water. A suction cup is mounted to the rear face of the rear panel thereby permitting the separable attachment of the device to a freezer wall as well as its inversion. The chamber is advantageously rotatably mounted to the suction cup to permit rotation thereabout. Indicia are located on the rear panel within each of the panel sections.

The improved measuring device is inexpensive, attractive, simple and convenient to use and of great versatility and adaptability.

BRIEF DESCRIPTION OF THE DRAWINGS

FIG. 1 is a front perspective view of a domestic refrigerator, partially broken away, to show a preferred location of one form of the improved measuring device;

FIG. 2 is an enlarged sectional view taken along line 2—2 in FIG. 1;

FIG. 3 is a front elevational view of the measuring device shown in an inverted preparation position;

FIG. 4 is a sectional view taken along line 4—4 in FIG. 3;

DESCRIPTION OF THE PREFERRED EMBODIMENT

Figure 5:
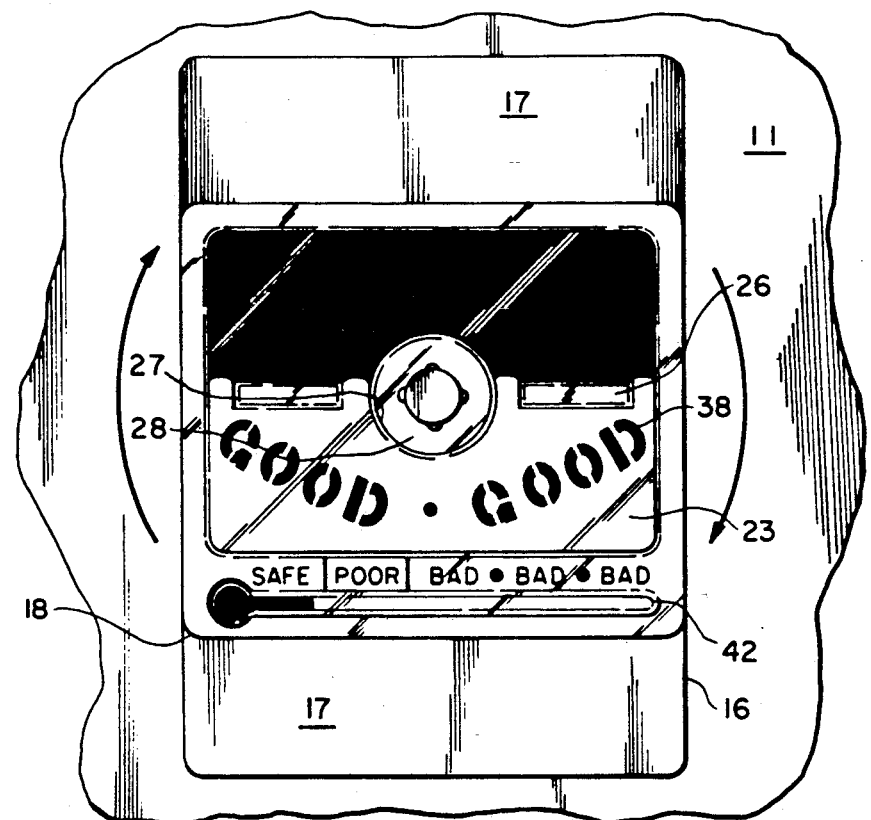
FIG. 5 is a view similar to FIG. 3 with the measuring device in its upright sensing position indicating proper temperature conditions.

Referring now to the drawings which illustrate a preferred embodiment of the present invention, the reference numeral 10 generally designates the improved measuring device which is shown separably attached to the inside face 11 of a vertical side wall 12 of the freezer compartment or space 13 of a domestic refrigerator 14. It should be noted that the measuring device 10 may be applied to any frozen food freezer cabinet or storage enclosure.

The measuring device 10 includes a rectangular rear panel 16 advantageously formed of plastic or other suitable material or the like and having a water resistant front face. The upper and lower borders 17 of panel 16 are preferably straight but could be rearwardly inclined, as best seen with the lower border 17 in FIG. 4. A front member 18 defining the front and peripheral walls of a cavity or chamber 19 whose rear wall is defined by panel 16 includes a rectangular front wall 20 parallel to and forwardly of and of lesser width than panel 16 and a peripheral skirt wall 21 integrally formed with and extending rearwardly from the edges of front wall 20 and terminating in an outwardly projecting peripheral flange 22. The side edges of flange 22 coincide with corresponding edges of panel 16 and the bottom section 25 of flange 22 is wider than the other sections of peripheral flange 22. The underface of flange 22 is superimposed on and hermetically sealed to the front face of panel 16.

The front member 18 is formed of a transparent preferably colorless thermoplastic polymeric material such as polystyrene or other suitable plastic preferably by vacuum forming or other known processes and may be adhered to panel 16 in the conventional manner. The chamber 19 is divided into a pair of vertically spaced similar first and second chamber sections 23 and 24 respectively by a pair of laterally spaced rearwardly projecting laterally extending ridges 26 medially disposed between the top and bottom edges of front wall 20. The outer ends of ridges 26 are spaced from the proximate faces of skirt walls 21 and the inner ends thereof are laterally spaced from a centrally located well 35 formed in front wall 20. Well 35 is delineated by a circular cylindrical wall 27 projecting rearwardly from and integrally formed with front wall 20 and terminating in a radially inwardly directed annular flange 28 overlying and sealed to the front face of panel 16 and having a central circular opening coinciding with a similar opening formed in rear panel 16.

A member 32 for detachably mounting the device 10 to a wall permitting its inversion includes a suction cup section 33 formed of a soft resiliently compressible flexible organic polymeric material and an integrally formed forwardly projecting cylindrical axial plug 34 of slightly greater diameter than the coaxial openings in panel 16 and front member front wall 18. Projecting radially outwardly from the peripheral face of plug 34 are peripherally spaced tabs 36. Plug 34 tightly engages the registering opening in panel 16 and wall 18, the tabs 36 engaging the front face of flange 28. This construction allows device 10 to be rotated in place about suction cup 33 making the inversion of device 10 simple.

Located within chamber 19 is a body of aqueous material 37 which is alternatively fluid and solid above and below respectively a predetermined freezing point. The aqueous material 37 is preferably water rendered opaque or colored by a coloring agent such as a pigment or dye dissolved or dispersed in the water. The amount of aqueous material in chamber 19 is less than the volume of chamber 19 and preferably about equal in volume to one of chamber sections 23, 24.

Imprinted on the front face of panel 16 are a first indicia 39 reading "BAD" registering with chamber section 24 and a second indicia 38 reading "GOOD" registering with chamber section 23.

Formed in flange section 25 is a laterally extending forwardly projecting ridge 40 enlarged at an end thereof as at 41 and defining a cavity housing a laterally extending thermometer member 42. Printed on the front face of panel 16 directly above ridge 40 are laterally spaced indicia 43 indicating the current ambient temperature.

In employing the measuring device 10 in accordance with the present method it is attached to the wall of a freezing space, for example, the inside face 11 of a side wall 12 of freezer section 13, with the chamber section 23 lowermost and the aqueous liquid 37 in its unfrozen liquid state approximately filling the chamber section 24 as seen in FIG. 3. Following the freezing of the aqueous liquid 37 to a solid state, the device 10 is rotated about plug 34 of the mounting unit 33 on the freezer wall, and inverted to bring the frozen liquid containing compartment uppermost so that the frozen liquid is uppermost and masking indicia 39 "BAD" as shown in FIG. 5. The device remains in this state as long as the temperature in the ambient freezer space does not rise above freezing for an unacceptable period of time, for example, sufficient to thaw the stored frozen food and melt the liquid 37.

Figure 6:
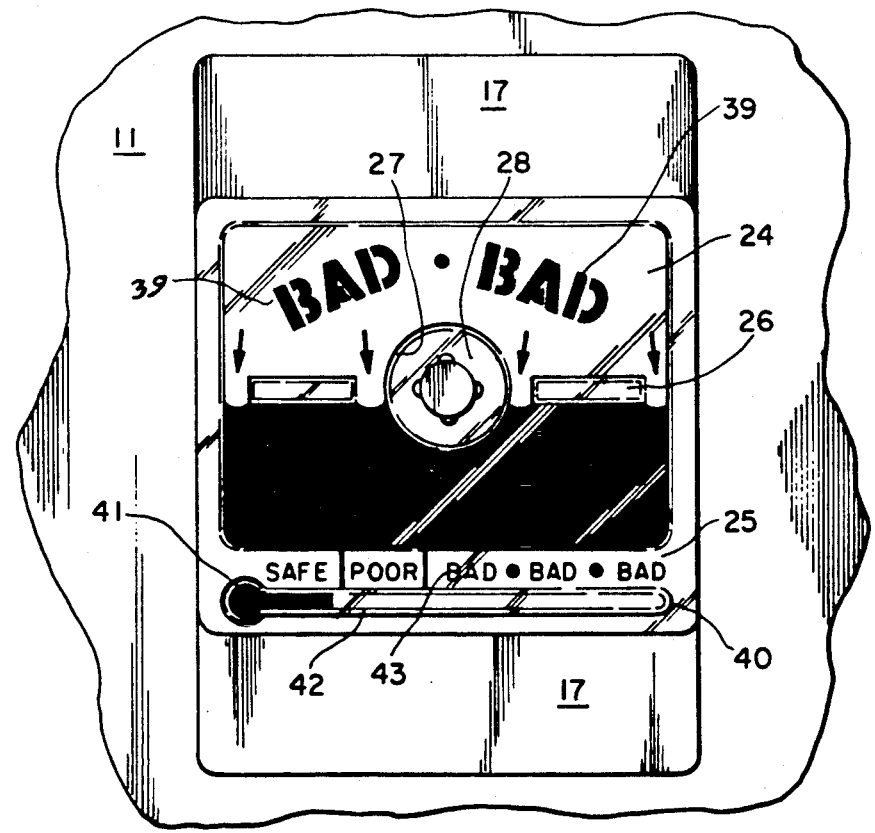
FIG. 6 is a view similar to FIG. 5 but with the device indicating a deficient temperature condition period having occurred.

In the event that the temperature in the freezer section 13 rises above freezing for an unacceptable length of time sufficient to result in the thawing of the stored food, the aqueous material 37 melts and flows into the lower positioned chamber section 23 to unmask indicia 39 "BAD" and render it visible from the exterior to indicate a deficiency in the storage space cooling and the possible deterioration of the thawed food (see FIG. 6). The deficiency indication is provided even if the freezer is brought back to its proper temperature as indicated by the safe reading of thermometer 41 in FIG. 6.

Another embodiment not shown is where the front member is formed of letters "GOOD" and "BAD" and interconnected in a like manner as the embodiment described. The device operates in the same manner except the liquid 37 forms the indicia thereby eliminating the necessity of indicia on the panel 16.

Also, while a suction cup 33 is disclosed, a hook member, not shown, can be mounted to rear panel 16 to allow device 10 to hang from a wire forming a shelf in the storage enclosure.

While there have been described and illustrated preferred embodiments of the present invention, it is apparent that numerous alterations, omissions and additions may be made without departing from the spirit thereof.

I claim:

1. A monitoring device comprising a chamber member having a rear wall and a transparent front wall transversely spaced from said rear wall delineating a visually accessible cavity including a pair of vertically spaced sections in liquid communication, an aqueous body partially filling said cavity and comprising water containing a coloring agent and alternatively assuming a solid and a liquid state when above and below a predetermined freezing point respectively, means for retaining said aqueous body while in said solid state in one of said cavity sections including laterally spaced transversely extending projections intermediate the top and bottom of said cavity and means for supporting said chamber member with a selected one of said cavity sections positioned above the other of said cavity sections.

2. The monitoring device of claim 1 wherein said rear wall carries indicia registering with each of said cavity sections and visible through said front wall.

3. A monitoring device comprising a chamber member including a rear panel and a transparent thermoplastic front wall parallel to said panel and having a rearwardly projecting skirt wall terminating in a peripheral flange hermetically sealed to said panel, said panel and walls delineating a visually accessible cavity including a pair of vertically spaced sections in liquid communication, an aqueous body partially filling said cavity and comprising water containing a coloring agent and alternatively assuming a solid and a liquid state when above and below a predetermined freezing point respectively, means for retaining said aqueous body while in said solid state in one of said cavity sections including laterally extending rearwardly projecting ridges located intermediate the top and bottom of and integrally formed with said front wall and means for supporting said chamber member with a selected one of said cavity sections positioned above the other of said cavity sections.

4. The monitoring device of claim 3 wherein said support means comprises a suction cup mounted on and projecting rearwardly of said panel.

5. The monitoring device of claim 3 wherein said aqueous body designates indicia in response to the ambient temperature.

6. The monitoring device of claim 3 including a thermometer located in said chamber member externally of said cavity.

* * * * *